United States Patent [19]
Hehl

[11] 3,788,794
[45] Jan. 29, 1974

[54] CLAMPING UNIT WITH A TURNING PLATE FOR AN INJECTION MOLDING MACHINE

[76] Inventor: Karl Hehl, Siedlung 183, Lossburg/Wurtt, Germany

[22] Filed: Apr. 7, 1971

[21] Appl. No.: 132,071

[30] Foreign Application Priority Data
Apr. 24, 1970   Germany............................ 2019874

[52] U.S. Cl.................. 425/450, 425/249, 425/444
[51] Int. Cl............................................. B29f 1/12
[58] Field of Search ... 425/246, 130, 249, 242, 444, 425/248

[56] References Cited
UNITED STATES PATENTS

| | | | |
|---|---|---|---|
| 3,482,284 | 12/1969 | Rees | 425/130 |
| 2,226,408 | 12/1940 | Nast | 425/130 |
| 2,333,059 | 10/1943 | Tucker | 425/242 X |
| 3,121,919 | 2/1964 | Turner | 425/249 X |

Primary Examiner—Robert D. Baldwin
Attorney, Agent, or Firm—Spencer & Kaye

[57] ABSTRACT

A clamping unit of an injection molding machine for producing multicolored cast pieces has a pair of mold halves, one of which defines at least two separate mold hollows for the cast piece, and complementary hollows or cores defined in the other mold half for forming at least two cavities in the mold. One of the cavities is configured to the shape of one colored component to the article.* The clamping unit has stationary and movable mold clamping plates. A turning plate is rotatably connected to one of the clamping plates for rotatably mounting one of the mold halves to the respective clamping plates. A fluid piston and cylinder arrangement is used to rotate the rotatably mounted mold half 180° between injections. The ejector is eccentrically mounted with respect to the injection axis and may be mounted in different locations on the clamping plate.

*The other has the configuration of the whole two-colored cast piece.

11 Claims, 2 Drawing Figures

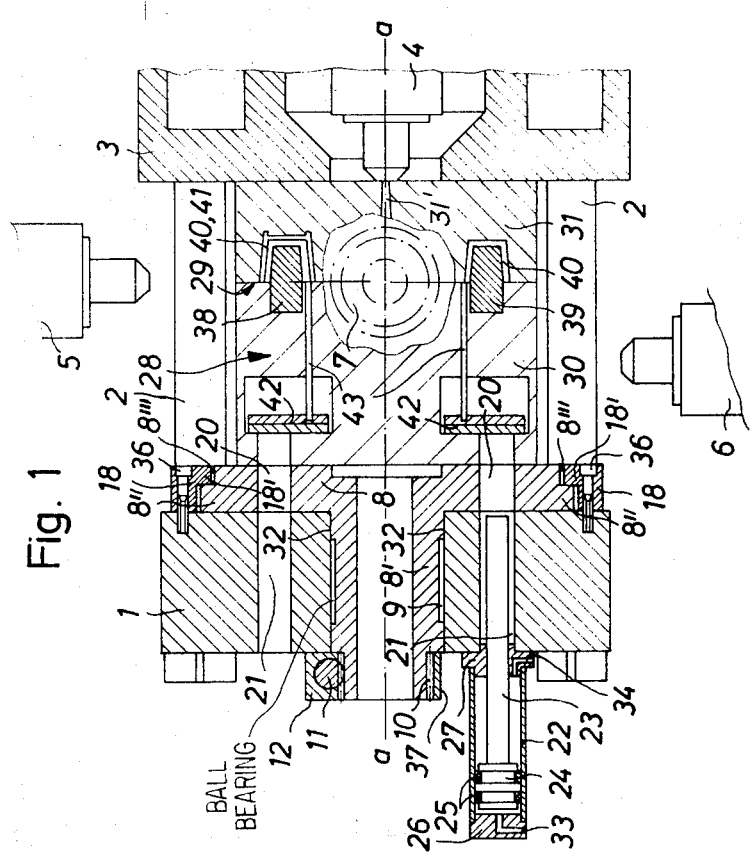
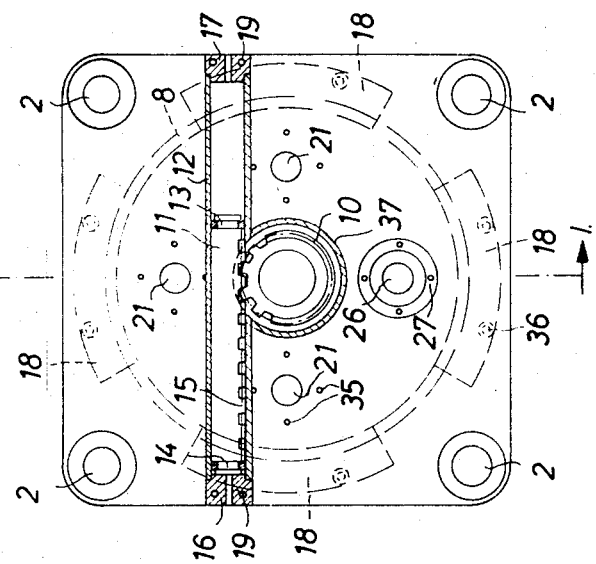

CLAMPING UNIT WITH A TURNING PLATE FOR AN INJECTION MOLDING MACHINE

BACKGROUND OF THE INVENTION

The present invention relates to a clamping unit for an injection-molding machine which produces multicolored objects. The injection mold is provided with a rotatable portion having at least two separately disposed mold portions intended for the same cast object, which, when the mold is closed, form mold cavities with hollows in the other mold half. One of these cavities corresponds to the shape of one color component of the cast piece and the other to the shape of the entire multicolored cast piece.

In a known clamping unit of this type, the rotatable portion is a mold or die plate of a mold part of the injection mold. The hollow defining molds are produced by rotating the mold plate after the mold has been opened. With such a mold, multicolored, or multimaterial objects can be produced by charging both mold cavities of the mold simultaneously with two injection units. In this way, there is produced in the one mold cavity an object which corresponds to one color component of the finished product and in the other mold cavity a composite multicolor object of the desired shape. During the next injection cycle and after rotation of the mold plate, the partially cast object which represents one color component of the finished object is completed with the second color component. The rotatable mold plate with the mold half having separate hollows and much of the mechanism for rotation thus represents an integral portion of the injection mold. Such an arrangement may be found in, for example, U.S. Pat. No. 3,319,300, issued May 16, 1967 to Karl Hehl.

SUMMARY OF THE INVENTION

It is an object of the present invention to produce a clamping unit of the above-mentioned type which results in a mold that can be constructed substantially simpler and, thus, more durable than previous molds of this type.

This is accomplished, according to the present invention, in that an entire mold half of the mold is held as the rotatable portion by a turning plate which is rotatably mounted in a clamping plate of the clamping unit.

Such a configuration results in a substantially more economical operation, because it permits a single rotating or turning device to be used for all desired shapes of molds.

Advisably, the turning plate is provided with a shaft which is coaxial with the injection axis of an injection unit operating transversely to the separating groove of the mold. This shaft may be mounted in a corresponding bore of the clamping plate.

This latter arrangement makes it necessary, however, that the usually coaxially disposed ejector be arranged eccentrically to the injection axis. This arrangement is actually of advantage, however, because the injection device now abuts directly on the multicolor cast piece also disposed eccentrically in the mold, so that a deflection device disposed concentrically to the injection axis used with ejectors previously is no longer required.

In a preferred embodiment of the present invention, a plurality of bores are provided for the ejector in the clamping plate and in the turning plate. The ejector may be selectively flanged in the area of each bore. In this way, the ejection mechanism, without a deflection device being required, may always be fastened to the clamping plate in a location that permits it to directly meet the cavity holding the finished two-color cast piece.

Advisably, the shaft of the turning plate ends in a pinion which meshes with teeth provided on a piston of a fluid piston and cylinder. This piston and cylinder are connected to the shaft by a common housing.

BRIEF DESCRIPTION OF THE DRAWINGS

FIG. 1 is a schematic side elevational, cross-sectional view taken generally along line 1—1 of FIG. 2.

FIG. 2 is a schematic front elevation view of a clamping unit according to the present invention with a fluid piston and cylinder for driving the turning plate shown in cross section.

DESCRIPTION OF THE PREFERRED EMBODIMENTS

A stationary mold clamping plate 3 of the clamping unit of an injection molding machine has a tubular shape and extends along the injection axis a—a. Plate 3 is provided with a plurality of bores (not shown) in which pistons (not shown) are mounted. At the free ends of piston rods 2 of these pistons, a movable mold clamping plate 1 is disposed.

In this manner, the clamping plate 3 serves to hold a mold half 31 with hollows or cores *(in which the one colored component 40 is formed and the two colored article 40,41 is finished.) in a known manner, and simultaneously houses the hydraulic system, with which the closing pressure for the mold is built up by charging cylinders disposed in the plate 3 with a suitable, known pressure medium.

Clamping plate 3 is penetrated along axis a—a by a suitable, known injection cylinder 4 which operates into mold 28 transversely to its separating groove 29 through a central injection passage 31' provided in the mold half 31 and extending along the injection axis a—a. Further, injection cylinders 5, 6 and 7, operating into the separating groove 29 of the mold 28, are also provided.

Examples of the construction of stationary clamping plates of the type discussed above may be found in, for example, U.S. Pat. No. 3,564,658, issued Feb. 23, 1971 to Karl Hehl.

A preferably hydraulically driven turning plate 8 together with a clamping surface for mold half 30 with cores 38,39 complementing the cast pieces 40 and 40,41 is attached to movable mold clamping plate 1. A hollow shaft 8' which is integral with turning plate 8 is rotatably mounted in a corresponding bore 32 defined in clamping plate 1. The bore 32 has an axis arranged coaxial with respect to injection axis a—a of a suitable, known injection unit 4 operating perpendicularly to the separating groove and can be rotated in, for example, a suitable, known ball bearing 9 arranged in a groove formed in shaft 8'. The shaft 8' is formed into a pinion 10 which meshes with teeth 15 formed in a piston 11 arranged in a fluid cylinder 12. The length of the teeth 15 on piston 11, which is provided with suitable known end seals 13, 14, and the diameter of the pinion 10 are desirably dimensioned so that a stroke of piston 11 rotates the turning plate 8 by 180°. In the area of its cylinder covers 16, 17, cylinder 12 can be fixed to the mold clamping plate 1 by means of, for example, suitable, known screws 19 in one of a plurality of pivot positions. Threaded bores 35 are arranged about each bore 21 for receiving screws 19. Cylinder 12 is connected to pinion housing 37 to form a common housing, so that pinion 10 always remains in engagement with teeth 15 of piston 11 when cylinder 12 is rotated. After screws 19 have been loosened, the cylinder 12 and shaft 8' of turning plate 8 can be rotated at will, either together or independently of one another.

The rotation of the turning plate 8 by 180° can be performed independently of the position in which the cylinder 12 is fixed on the mold clamping plate 1. For example, if it is necessary to provide a place for special mechanisms (not shown), the position of the cylinder may be changed so that the needed place can be provided.

Annular segments 18, which contact the circumferential portion 8" of the circular turning plate 8, serve to guide the turning plate 8. These annular segments 18, which are dimensioned to be flush with the clamping surface of the turning plate 8, have a flange 18' which is arranged to extend into cut-out portion 8''' of circumferential portion 8"; and are fastened to the plate 1 by suitable, known fasteners 36.

In the illustrated embodiment, turning plate 8 and clamping plate 1 are each provided with four matching bores 20 and 21, respectively, through which pass piston rod 23 of the piston 24 of an ejector cylinder 22 which serves as the eccentrically mounted ejector. Piston 24 is provided with suitable, known seals 25. A suitable, known pressure medium, such as a hydraulic fluid, is passed through ports 33,34 defined in cylinder covers 26, 27, respectively. Cylinder cover 27, which is provided in the form of a flange, serves additionally to fasten the ejector device to the movable mold clamping plate 1.

The drive cylinder 12 can be fixed with the aid of the clamping screws 19 in such a position with respect to clamping plate 1 that it is not in the way of ejector cylinder 22. Cylinder 22 may be selectively fastened to clamping plate 1 so that rod 23 extends through those bores 20, 21 in whose linear extension the two-color cast piece to be ejected is disposed. In this manner, a deflecting device for ejecting the finished articles is unnecessary.

It will be understood that the above description of the present invention is susceptible to various modifications, changes and adaptations, and the same are intended to be comprehended within the meaning and range of equivalents of the appended claims.

I claim:

1. A clamping unit of an injection molding machine for producing multicolored cast pieces, the clamping unit defining an injection axis and comprising in combination:
    a. a pair of mold halves, which together define a separating groove extending in a direction perpendicular to the injection axis, one of said mold halves being provided with a central injection passage extending along the injection axis, and said mold halves being formed to together define at least two cavities in the mold, one of said cavities configured to the shape of an entire multicolored article and the other configured to the shape of one color component of the article;
    b. a movable mold clamping plate defining a bore having an axis arranged coaxially with respect to the injection axis; and
    c. means defining a turning plate having a hollow shaft extending from one side thereof, said shaft being rotatably mounted in said bore for causing said turning plate to be exclusively supported by said movable mold clamping plate for rotation about the injection axis, said turning plate having the other of said mold halves mounted thereon for rotation about an axis parallel to said injection axis.

2. A clamping unit as defined in claim 1, wherein said turning plate is a circular turning plate having a circumferential portion, and further including segments arranged in contact with said circumferential portion for guiding said turning plate.

3. A clamping unit as defined in claim 2, wherein said segments are annular segments fastened to said clamping plate and dimensioned to be flush with a respective surface of said clamping plate.

4. A clamping unit as defined in claim 3, wherein said circumferential portion has a cut-out portion, and said segments have a flange which is arranged to extend into said cut-out portion.

5. A clamping unit as defined in claim 4, further including a pinion formed on an end of said shaft, and a fluid piston and cylinder having teeth formed on the piston thereof and arranged with said teeth meshing with said pinion.

6. A clamping unit as defined in claim 5, wherein the length of said teeth and the diameter of said pinion are dimensioned so that a stroke of said piston rotates said turning plate by 180°.

7. A clamping unit as defined in claim 6, further including a housing for said pinion, and wherein the cylinder of said piston and cylinder is connected to the pinion housing to form a common housing.

8. A clamping unit as defined in claim 7, further including at least one ejector cylinder eccentrically mounted on said clamping plate.

9. A clamping unit as defined in claim 8, wherein said ejector cylinder has a flange arranged for fastening said ejector cylinder to said clamping plate.

10. A clamping unit as defined in claim 9, wherein said turning plate and said clamping plate are each provided with a plurality of pairs of matching bores, and further including a piston arranged in said ejector cylinder and having a piston rod which passes through one of said pairs of matching bores at a predetermined location where said ejector cylinder is selectively fastened.

11. A clamping unit as defined in claim 10, wherein said fluid piston and cylinder can be rotated with said turning plate and be fixed to said clamping plate in any predetermined position of said turning plate.

* * * * *